United States Patent [19]

Smith

[11] 4,078,816
[45] Mar. 14, 1978

[54] HYDRAULICALLY DRIVEN TWO-WHEELED PEDICAB

[76] Inventor: Michael Sean Smith, 84 Athens St., San Francisco, Calif. 94112

[21] Appl. No.: 688,975

[22] Filed: May 24, 1976

[51] Int. Cl.² .............................................. B62M 1/10
[52] U.S. Cl. .................................................. 280/216
[58] Field of Search .............. 280/216, 201, 251, 253; 180/66 R

[56] References Cited

U.S. PATENT DOCUMENTS

| | | | |
|---|---|---|---|
| 576,538 | 2/1897 | Bellamy | 280/216 |
| 602,618 | 4/1898 | Eyster | 280/216 |
| 636,184 | 10/1899 | Roxendorff | 280/251 X |
| 735,628 | 8/1903 | Waxel | 280/216 |
| 1,410,326 | 3/1922 | Labak | 280/216 |
| 2,137,574 | 11/1938 | Kromer | 180/1 R |
| 2,177,381 | 10/1939 | Bichi | 280/216 |
| 3,834,733 | 9/1974 | Harris | 280/251 |
| 3,922,005 | 11/1975 | Bundschuh | 280/251 X |

FOREIGN PATENT DOCUMENTS

| | | | |
|---|---|---|---|
| 1,050,228 | 1/1954 | France | 280/216 |
| 411,325 | 8/1945 | Italy | 280/253 |
| 7,771 | 12/1893 | Switzerland | 280/216 |
| 674,967 | 7/1952 | United Kingdom | 280/216 |

*Primary Examiner*—Robert R. Song
*Attorney, Agent, or Firm*—Richard Esty Peterson

[57] ABSTRACT

A hydraulically driven, two-wheeled pedicab constructed with an enclosed cockpit for inclined positioning of a solo rider. The pedicab includes a reciprocating piston pump hydraulically connected to a hydraulic, rotary motor for powering at least one of the wheels, and, a power reserve having a rotary converter for selectively converting hydraulic fluid energy into a stored, compressed gas potential energy, the stored energy being selectively cycled into fluid energy when desired for assisting in the propulsion of the pedicab.

6 Claims, 8 Drawing Figures

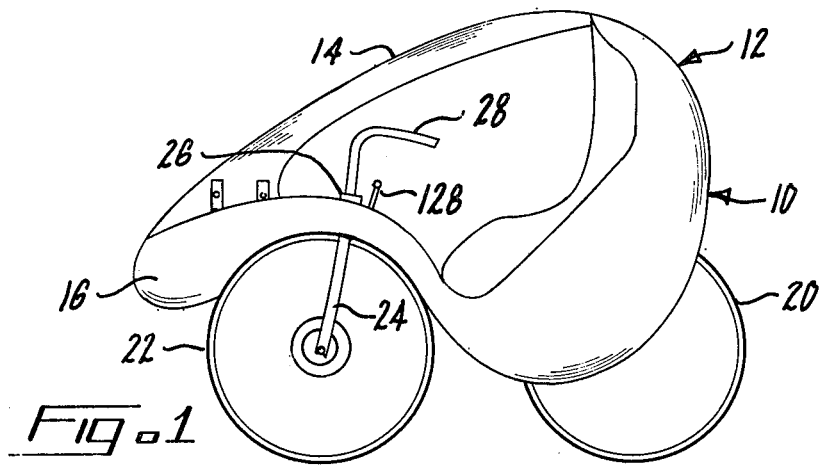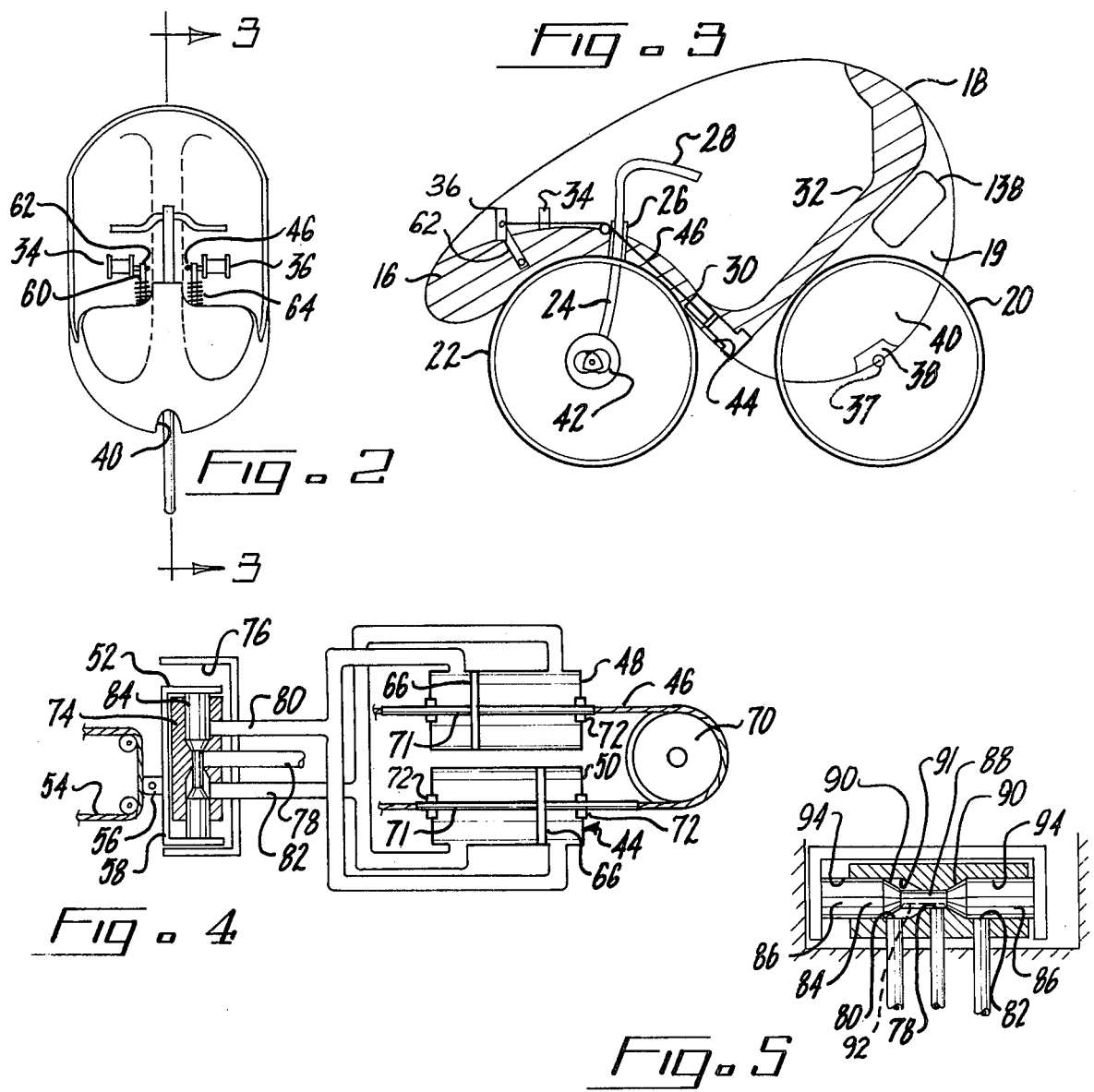

HYDRAULICALLY DRIVEN TWO-WHEELED PEDICAB

BACKGROUND OF THE INVENTION

This invention relates to a bicycle driven by a novel means of propulsion, in particular, by a hydraulic motor.

Bicycles and their means of propulsion have had a long history of development. The earliest bicycles were simply propelled by pushing the feet against the ground. The first bicycle which was propelled by a mechanical linkage with the feet off the ground was attributed to Kirkpatrick Macmillan in 1839. The adaptation of a chain drive to the bicycle by H. J. Lawson occurred a mere 100 years ago in 1874. Collateral developments relating to new materials and construction concepts have, in the last 100 years, evolved the bicycle into the efficient, lightweight, multigear, and multipurpose bicycles of today. However, even the most contemporary bicycles, though highly refined, remain powered by a crank pedal and chain system. Furthermore, except for the three-wheeled conventional pedicabs used in the Orient, which have a partially enclosed passenger compartment, the bicycle has remained a completely open conveyance, subjecting the rider to all the discomforts of the elements.

SUMMARY OF THE INVENTION

The present invention utilizes a novel means of propulsion which completely changes both the drive means and configuration of the bicycle. The drive means and general configuration of the invention bicycle are, furthermore, readily adaptable to a three- or four-wheeled, foot-driven vehicle. In its preferred embodiment, the pedicab of this invention utilizes a predominantly transparent shell to enclose a moulded frame for a two-wheeled, hydraulically driven system. The pedicab of this invention is made practicable by the development of new, lightweight materials and hydraulic systems; for example, high strength plastics and efficient rotary engines. In the latter respect, efficient rotary vane and Wankel engines have performed efficiently as pumps as well as engines. The Wankel device is used to describe the preferred embodiment of the invention since the basic construction and operating principles of the Wankel are well known to those skilled in the art. Its adaptability to function either as an engine or pump renders the Wankel device ideal for a stored energy system included as a concomitant feature in the preferred embodiment.

In summary, the pedicab of this invention employs a pedal system to operate a reciprocal fluid pump which is hydraulically connected to a Wankel engine. The Wankel engine is directly coupled mechanically to one of the wheels. The pumped fluid drives the engine and rotates the wheel. Fluid is then returned to the pump for recycling.

The stored energy system is used to retrieve otherwise lost energy during downhill coasting or breaking. The retrieved energy is stored until needed or desired as in an uphill climb. When a maximum amount is stored, such energy may also be released, in part, to compliment ordinary pedaling. The stored energy system operates by including a cutoff or auxiliary line in the return line from the Wankel engine. During a downhill coast, the Wankel engine operates as a pump. Rather than simply returning the pumped fluid to the pedal-operated master pump, this fluid is detoured by a manually-operated valve system to a converter unit. The converter unit comprises a small tandum Wankel device, having a hydraulic component functioning in a first mode as a fluid engine and an air component operating in a first mode as an air compressor. The compressed gas is stored in a storage cylinder and is, by selective manual control, redirected through the converter unit in a second mode to operate the gas component as an air-driven motor and the hydraulic component as a fluid pump. In the latter mode of operation, the fluid is returned under pressure to the reciprocal pump to assist in the pedaling action.

Other features in the drive system such as variable crank pedals, which allow an automatic adjustment of the crank moment provide for a simulated reduction or increase in gearing of the drive transmission.

Fabrication of the various components comprising the pedicab uses a variety of polymeric materials in the outer shell, in the moulded frame and in the valves and elements of the engine. Since weight, strength and durability are important characteristics in constructing an operable vehicle, many materials will be suggested for their inherent characteristics. It is, of course, understood that other materials, particularly those having superior characteristics, may be substituted as they are developed or when costs permit.

BRIEF DESCRIPTION OF THE DRAWINGS

FIG. 1 is a side elevational view of the pedicab.

FIG. 2 is a front elevational view of the pedicab of FIG. 1.

FIG. 3 is a cross-sectional view of the pedicab taken on the lines 3—3 in FIG. 2.

FIG. 4 is a schematic cross-sectional view of the master pump.

FIG. 5 is an enlarged detail view of the toggle valve of the master pump.

DETAILED DESCRIPTION OF THE PREFERRED EMBODIMENT

Figure 6:
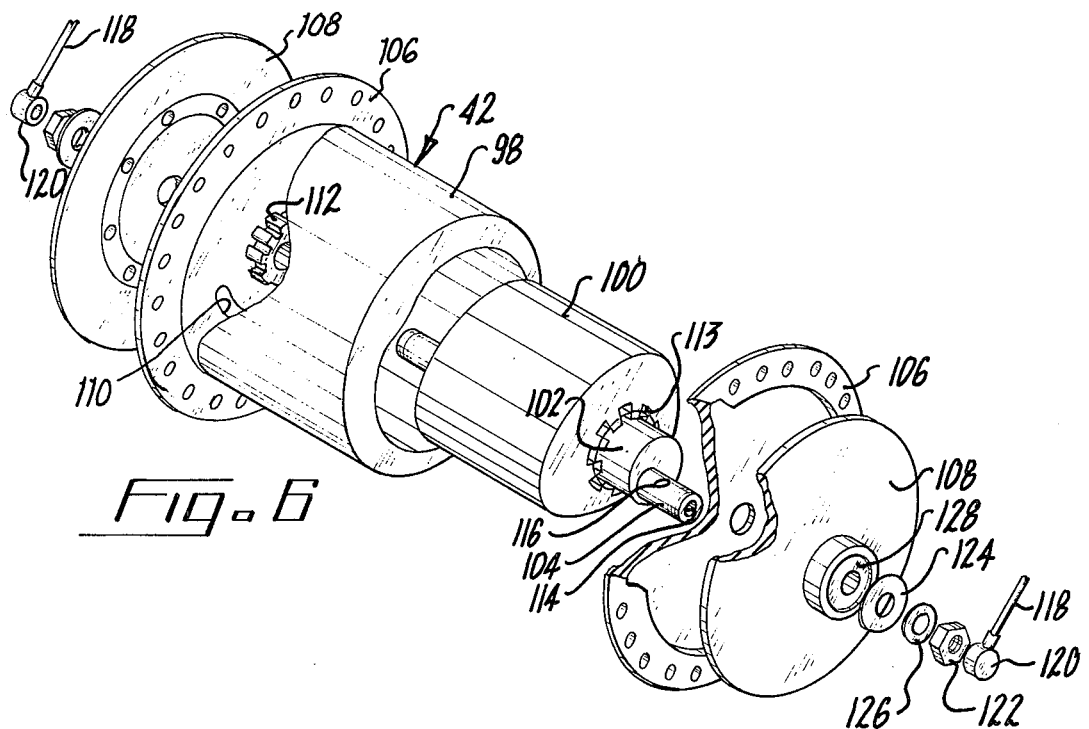
FIG. 6 is an exploded view of the front hub rotary engine-pump.

The pedicab of the preferred embodiment of the invention, shown in FIG. 1 of the drawings and designated generally by the reference numeral 10, comprises a foot-powered vehicle with a substantially enclosed cockpit allowing a sole rider to propel the vehicle from an inclined, seated position. The pedicab is preferably a two-wheeled bicycle but may, with insignificant modification, be constructed as a three-wheeled vehicle. It may also be designed as a four-wheeled vehicle, but the additional weight for a foot-driven device becomes an important limiting consideration.

Because the pedicab is designed to provide a substitute transportation source, which is more than a simple pleasure vehicle, the vehicle has a streamlined body 12 with a clear canopy 14 for all weather use. The canopy 14 is formed of a moulded plexiglass or other clear or tinted, lightweight material and is attached by suitable releasable fasteners (not shown) to a contoured core frame 16. As shown in FIG. 3, the core frame 16 is preferably fabricated from a formed or moulded polystyrene foam reinforced by a fiberglass shell 18. The rear portion 19 of the body 12 is formed with a contoured, unfilled shell of plastic or fiberglass and provides a housing for the rear wheel 20. A front wheel 22 is connected to a conventional steering fork 24 seated in a journal 26 in the core frame 16 and connected to a handlebar 28 within the rider's compartment. The wheels 20 and 24 are conventional bicycle wheels which are lightweight, spoked, pneumatic-tired wheels.

As shown in the cross-sectional view of FIG. 3, the core frame 16 is contoured to provide a seat 30 and backrest 32 to allow the rider to assume a comfortable inclined position, which permits a powerful drive stroke to be applied to a pair of elevated pedals 34 and 36 within the rider's compartment. In the preferred embodiment, the rear wheel 20 is simply rotatably supported by a bearing axel 37 journaled in an axel plate 38 fastened to the wall of a wheel well 40 in the body shell 18. In this embodiment, the front wheel 22 houses the drive mechanism 42 and the rear wheel is freely rotatable on its bearing axel 37. If desired, the arrangement can be reversed.

With reference to FIGS. 3 and 4, mechanical power from the pedals 34 and 36 is transmitted by a cable 46 to a reciprocal hydraulic pump 44 housed within the base of the contoured core frame 16. For optimum performance in connection with a feedback system, the master pump 44 is a two-cylinder, double-acting piston pump, as shown in FIG. 3. The two-cylinder pump is preferred over a single-cylinder pump for reasons of symmetry. However, a double-acting, single-cylinder pump may alternately be utilized with a resultant reduction of the number of hydraulic lines.

To regulate the direction of fluid flow to and from the cylinders 48 and 50 of the pump, a toggle valve 52 is arranged adjacent the pump. The toggle valve is actuated by its connection to a feedback loop 54 of the cable 46.

In operation, the connection of the cable to the toggle valve at clamp 56 can be considered the down point of the cable 46 since the toggle valve sliding yoke 58 has a displacement limited to less than an inch. Each leg of the cable 46 in the feedback loop 54 is looped around a collar 60 on each pedal crank 62. The collar 60 is slidably situated on a coil spring 64 to provide an automatic torque adjustment allowing a relatively constant or attenuated force level at the pedals by action of the changing effective moment arm as the collar 60 slides down the pedal crank while compressing the spring 64. In this manner, a shifting scheme can be omitted. After looping around the collars 60 the cable 46 passes through the ends of the cylinders, 48 and 50, and is fastened to a double-acting drive piston 66 in each cylinder. The cable 46 passes through the opposite ends of the cylinders 48 and 50, and loops around a pully wheel 70, having a selected diameter which aligns the cable with the axes of the respective cylinders. The portions of the cable 46 passing through the cylinders may be encased in a tubular sheath 71 for improving the sealing capabilities of the cylinder packings 72.

The toggle valve 52 is simply a double-end needle valve. Although a twin-stacked valve system is used to regulate both the fluid supply and the return for the pump only one of the stacked valves is shown in the schematic view of FIG. 4 and described herein. Essentially, a fixed block 74 is mounted within an oversized recess 76 in the core frame 16. The block includes three ports for each of the stacked systems, a constantly open supply port 78, a selectively opened first port 80 and a selectively opened second port 82, the first and second ports 80 and 82 being connected to opposite ends of the cylinders 48 and 50. Fluid is delivered through the common supply port 78 and selectively directed to the appropriate end of the cylinder behind the piston 66 to maintain the fill in the pump. In the twin system, fluid is concurrently pumped or returned selectively through an appropriate first or second port hydraulically connected to respective opposite ends of the cylinders and then through a common return to the drive mechanism 42 for the pedicab.

Selective operation of the toggle valve 52 is controlled by a toggle yoke 58 connected to the cable. The yoke is connected to a bridging-needle stem 84 having a configuration of two enlarged cylindrical ends 86 with a small, elongated, cylindrical center 88, the transition being formed by opposed conical necks 90. The stem 84 is arranged within a core 91 having a nearly identical configuration without the elongated cylindrical center, thereby allowing the stem to reciprocate within the core. The common port 78 communicates at the juncture of the two conical walls of the core 91 through stem flue 92 and the first and second ports 80 and 82 communicate at the surface of the conical walls and are alternately exposed or closed depending on the position of the stem in the core 91.

Fluid in the reciprocal pump is delivered under pressure to the drive mechanism 42 mounted at the hub of the front wheel 22. The preferred drive mechanism comprises a conventional "Wankel" type pump-motor. However, the customary rotor of the "Wankel" pump-motor is maintained stationary and comprises the front axle of the pedicab and the epitrochoidal housing forms the rotating hub of the wheel.

Referring to the exploded view of FIG. 6, the drive mechanism 42 is shown to comprise a Wankel pump-motor which is conventional in most respects except for the mounting scheme. In the mechanism shown, a rotatable epitrochoidal housing 98 houses a triangular-shaped stator 100, which is customarily the rotor in the Wankel engine. The stator 100 is mounted on the lobe 102 of a drive shaft 104, which projects through two end plates 106 attached to the housing 98 and through two cover plates 108. Each end plate 106 with its respective cover plate 108 forms a sealed chamber on each side of the housing. On one side, fluid is supplied to the pump-motor from the reciprocal foot-operated pump, and on the other side, fluid is delivered from the pump-motor for return to the reciprocal foot-operated pump.

The end plates 106, in addition to sealing the apitrochoidal housing 98, form the hub for the spoked front wheel. The end plates include intake or exhaust ports 110 and a concentric gear 112, which engages a ring gear 113 in the stator 100.

The cover plates can either be constructed to remain stationary or rotate with the end plates. Sealing problems are somewhat diminished in allowing the cover plates to rotate. However, the fluid delivery must thereby be made through both ends of the axel or drive shaft. A passage 114 is provided from the end of the drive shaft to one or more ports 116 on the shaft within the chamber between the end and cover plates. Fluid is delivered through hydraulic lines 118 connected to cap fittings 120 which are threaded to the ends of the drive shaft 104, one of the hydraulic lines supplying fluid to the drive mechanism 42 and one returning fluid from the drive mechanism. The drive mechanism is fastened to the steering fork (shown in FIG. 1) by a nut 122 and pair of washers 124 and 126, the larger of the washers interfacing a bearing 128 in the cover plate 108.

While the reciprocal pump and Wankel pump motor provide the basic drive for the pedicab, it is preferred that an auxiliary, stored energy system be incorporated to store otherwise wasted energy generated in downhill coasting and deliver such energy when needed in uphill climbs or otherwise when desired. This system is activated by a three-position valve control lever 128 shown in FIG. 1.

Figure 7:
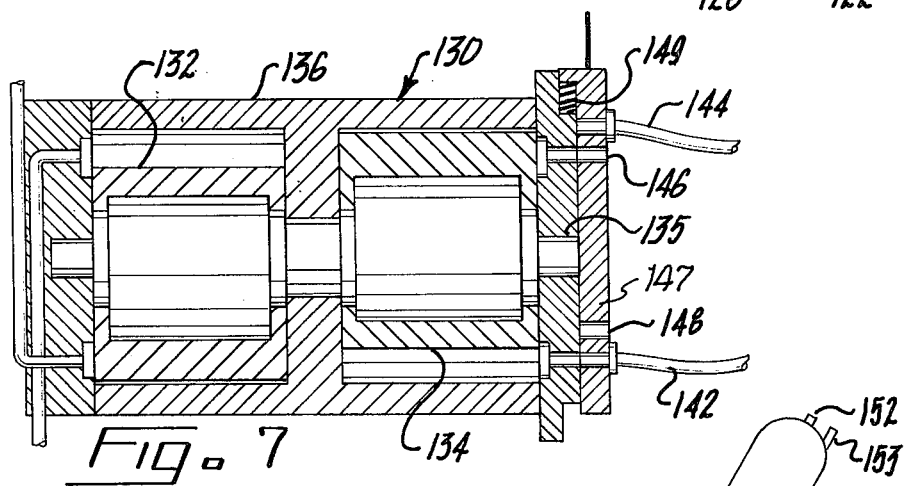
FIG. 7 is an enlarged cross-sectional view of a tandum rotary engine-pump.

The valve control lever is connected mechanically to the valve system for a double-chamber Wankel pump-motor shown in cross section in FIG. 7. Again, a conventional Wankel-type pump is utilized as a pump and motor which, in the case of the pump-motor energy converter 130, includes a tandum-connected fluid rotor 132 and air rotor 134 mounted on a single shaft 135 within a single two-chamber housing 136. The energy converter is selectively employed either to store energy, by driving the fluid portion as a motor and concurrently operating the air portion as a pump to compress air for storage in a storage tank 138 (shown in FIG. 3 and schematically illustrated in FIG. 8) or to release energy, by driving the air portion as a motor and concurrently operating the fluid portion as a pump. In the latter case, the pressure of the return fluid from the basic drive mechanism 42 is increased to augment or bypass the pressure developed by the reciprocal foot pump. In this manner, the pressure differential applied to the drive motor is increased, thereby enhancing the resultant power output.

Figure 8:
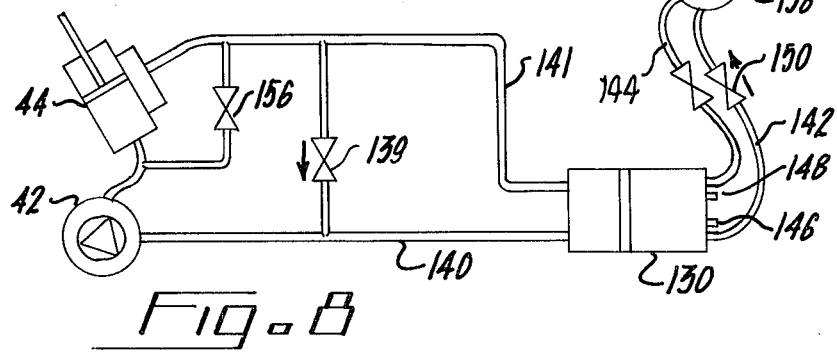
FIG. 8 is a schematic view of the hydraulic system and converter system.

Referring to FIG. 8, the hydraulic schematic illustrates the flow circuit for the driving fluid. The normal circuit comprises the reciprocal foot pump 44, the drive mechanism 42 and an open shunt valve 139. When it is desired to store energy, or alternately to release energy, shunt valve 139 is closed. The alternate circuit including fluid supply line 140, fluid return line 141 and the converter 130 is then placed in operation. While valves for the converter may be utilized, the latent impedence in the converter system will prevent it from having any significant effect on the normal operating circuit when valve 139 is open.

The converter is operable in either of two modes: one, a compression mode with an air supply line 142 to the storage tank functioning to deliver compressed air to the tank for storing energy on a downhill run; and two, a release mode with an air return line 144 open allowing compressed air to the converter 130. Supply line 142 and return line 144 operate in conjunction with vented intake ports 146 and exhaust ports 148, the intake port being open during the compression mode and closed during the release mode and the exhaust port being open during the release mode and closed during the compression mode. A conventional multiport slide valve 147, as shown in FIG. 7, will perform the necessary selection of appropriate valving. Preferably, it is biased by a spring 149 to the compression mode shown and is mechanically connected to the control lever 128 together with the fluid shunt valve 139 for selective operation. The control lever should have three positions: one, with shunt valve open and slide valve in its normal compression mode; two, with shut valve closed and slide valve in its normal compression mode; and three, with shunt valve closed and slide valve in its release mode.

Added elements are included for a smooth operating of the system. A one-way valve 150 on the supply line 142 insures that compressed air is delivered to the tank only after overcoming any back pressure. A pressure release valve 152 on the tank insures a maximum pressure is not exceeded. A one-way by-pass valve 156 bypassing the reciprocal pump allows the systems to operate without manipulating the feet when pressure behind the hydraulic pump is greater than in front of the pump; for example, when coasting with or without the converter in the circuit.

These and other features may be included for improving the efficiency and convenience of the basic system shown in the drawings and described in the specification.

What is claimed is:

1. A pedicab comprising: a vehicle having wheels, a steering mechanism, a hydraulic master pump with means for foot operation of said master pump, a hydraulic drive motor hydraulically connected to said master pump and mechanically connected to at least one of said wheels of said vehicle for powering said vehicle, and, converter means cooperating with said hydraulic drive motor and said hydraulic pump for converting and storing energy and selectively releasing said energy for assisting said powering of the vehicle wherein said drive motor is operable selectively as a motor or pump, said converter means including a hydraulic pump-motor hydraulically coupled to said hydraulic drive motor; an air compressor-motor mechanically coupled to said hydraulic pump-motor, air storage means connected to said compressor-motor for storing and releasing air through said compressor-motor; and valve control means for selective operation of said converter means, said valve control means having first means for selectively operating said hydraulic pump-motor as a motor and concurrently operating said air compressor-motor as a compressor, and second means for selectively operating said hydraulic pump-motor as a pump and said air compressor-motor as a motor; wherein said hydraulic drive motor, said hydraulic pump-motor and said hydraulic compressor-motor comprise Wankel-type rotary units operable selectively as a pump or motor.

2. The pedicab of claim 1 wherein said master pump comprises a reciprocal pump with valve means for controlled pumping of fluid to said hydraulic drive motor.

3. The pedicab of claim 1 wherein said vehicle has an inclined seat and backrest and a substantially enclosed cab.

4. The pedicab of claim 3 wherein said vehicle has a frame comprising a contoured, reinforced core forming in part said inclined seat and backrest, and lightweight, streamlined shell with a transparent canopy forming said cab.

5. The pedicab of claim 2 wherein said means for foot operation of said pump comprises foot pedal cranks having mechanical connectors connecting said cranks to said hydraulic master pump, said cranks having means for adjusting the operating torque to a relatively constant level.

6. The pedicab of claim 5 wherein said reciprocal master pump includes at least one piston and said mechanical connectors of said foot pedal cranks to said pump comprises a cable.

\* \* \* \* \*